US011363909B2

(12) United States Patent
Hendershot et al.

(10) Patent No.: US 11,363,909 B2
(45) Date of Patent: Jun. 21, 2022

(54) SENSOR DEVICE FOR PROVIDING CONTROL FOR A FOOD PROCESSING SYSTEM

(71) Applicant: Air Products and Chemicals, Inc., Allentown, PA (US)

(72) Inventors: Reed Jacob Hendershot, Orefield, PA (US); Avishek Guha, Allentown, PA (US); Shawn Haupt, Allentown, PA (US); Ankit Naik, Allentown, PA (US); Michael Robert Himes, Macungie, PA (US); Erdem Arslan, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 183 days.

(21) Appl. No.: 16/848,936

(22) Filed: Apr. 15, 2020

(65) Prior Publication Data

US 2021/0321820 A1    Oct. 21, 2021

(51) Int. Cl.
*G06K 9/00* (2022.01)
*A47J 37/04* (2006.01)
(Continued)

(52) U.S. Cl.
CPC .......... *A47J 37/045* (2013.01); *G01J 5/0022* (2013.01); *G06N 3/04* (2013.01); *G06V 20/20* (2022.01)

(58) Field of Classification Search
CPC .. A47J 37/045; G01J 5/0022; G06K 9/00671; G06K 9/00771; G06K 9/6272;
(Continued)

(56) References Cited

U.S. PATENT DOCUMENTS 6,233,966 B1     5/2001  Delpuech et al.
2014/0230460 A1*  8/2014  Newman ............... F25D 17/005
                                                                  62/52.1
(Continued)

FOREIGN PATENT DOCUMENTS

EP         0667501 A1     8/1995
EP         2998663 A1     3/2016
(Continued)

OTHER PUBLICATIONS

Shaikh, Nazrul I., et al; Model Predictive Controller for Cryogenic Tunnel Freezers, 2006; 8 pgs.; The Pennsylvania State University, University Park, PA.

(Continued)

*Primary Examiner* — Dhaval V Patel
(74) *Attorney, Agent, or Firm* — Matthew R. Weaver

(57) ABSTRACT

A processor of a sensor device receives a plurality of images capturing a scene that depicts at least a portion of a conveyer entering a treatment area of a food processing system. The processor processes one or more images, among the plurality of images, to detect one or more characteristics in the scene. Processing the one or more images includes detecting presence or absence of a product on the at least the portion of the conveyor depicted in the scene, and classifying the scene as having one or more characteristics among a predetermined set of characteristics. The sensor device provides characteristics information indicating the one or more characteristics detected in the scene to a controller. The characteristics information is to be used by the controller to control operation of one or both of the conveyor and the treatment area of the food processing system.

14 Claims, 6 Drawing Sheets

(51) Int. Cl.
*G01J 5/00* (2022.01)
*G06N 3/04* (2006.01)
*G06V 20/20* (2022.01)

(58) Field of Classification Search
CPC .. G06N 3/04; B65G 43/08; A23B 4/09; A23L 3/375; F25D 13/067; F25D 13/06
See application file for complete search history.

(56) References Cited

U.S. PATENT DOCUMENTS

| | | | |
|---|---|---|---|
| 2017/0138661 A1 | 5/2017 | Newman et al. | |
| 2018/0338354 A1* | 11/2018 | Bassill | H05B 6/6464 |
| 2018/0365820 A1* | 12/2018 | Nipe | G06T 7/11 |
| 2021/0112818 A1* | 4/2021 | Krog | A22C 17/0086 |
| 2021/0201471 A1* | 7/2021 | Sreeram | G06K 9/00 |
| 2021/0204553 A1* | 7/2021 | Mehta | G06K 9/6269 |

FOREIGN PATENT DOCUMENTS

| | | | |
|---|---|---|---|
| WO | 2006073909 A2 | 7/2006 | |
| WO | 2016043925 A1 | 3/2016 | |
| WO | 2020003310 A1 | 1/2020 | |

OTHER PUBLICATIONS

Shaikh, Nazrul I., et al; Vision System for Model Based Control of Cryogenic Tunnel Freezers; 2005; 10 pgs. The Pennsylvania State University, University Park, PA.

\* cited by examiner

SENSOR DEVICE FOR PROVIDING CONTROL FOR A FOOD PROCESSING SYSTEM

FIELD OF THE DISCLOSURE

The present disclosure relates generally to sensor devices and, more particularly, to imaging sensor devices for providing control for freezing or chilling equipment.

BACKGROUND

Food industries often utilize various types of conveyor equipment for freezing or chilling products. For example, a food production or processing plant may utilize a conveyor freezer for freezing various types of food, such as fish, chicken, shrimp, meat patties, fruits, vegetables, etc. As another example, a food production or processing plant may utilize a conveyor cooler for quickly chilling products, such as eggs, cured meats, cheeses, etc. In such freezing or chilling equipment, the product is loaded onto a continuously moving conveyor that moves through a treatment area, which may be an enclosed area such as a tunnel. As the conveyor belt moves through the treatment area, a coolant is supplied to the product to bring the temperature of the product to a desired cooling or freezing temperature. Such typical freezing or chilling equipment does not monitor, in real-time, characteristics of the conveyor, and does not automatically control operating conditions of the freezing or chilling equipment based on real-time characteristics of the conveyor, which often results in inefficient use of the equipment and increased costs of operating the equipment.

SUMMARY

The following introduces a selection of concepts in a simplified form in order to provide a foundational understanding of some aspects of the present disclosure. The following is not an extensive overview of the disclosure and is not intended to identify key or critical elements of the disclosure or to delineate the scope of the disclosure. The following merely summarizes some of the concepts of the disclosure as a prelude to the more detailed description provided thereafter.

In an embodiment, a method of providing control for a food processing system, the method includes receiving, at a processor of a sensor device, a plurality of images capturing a scene that depicts at least a portion of a conveyer entering a treatment area of the food processing system, wherein respective ones of the images capture the scene at respective points in time. The method also includes processing, with the processor of the sensor device, one or more images, among the plurality of images, to detect one or more characteristics in the scene, including i) detecting presence or absence of a product on the at least the portion of the conveyor depicted in the scene and ii) classifying the scene as having one or more characteristics among a predetermined set of characteristics. The method additionally includes providing, by the sensor device to a controller, characteristics information indicating the one or more characteristics detected in the scene, wherein the characteristics information is to be used by the controller to control operation of one or both of a) the conveyor and b) the treatment area of the food processing system.

In another embodiment, a sensor device for providing control for a food processing system comprises at least one camera configured to capture a plurality of images capturing a scene that depicts at least a portion of a conveyer entering a treatment area of the food processing system, wherein respective ones of the images capture the scene at respective points in time. The sensor device also comprises a processor implemented on one or more integrated circuit devices configured to process one or more images, among the plurality of images, to detect one or more characteristics in the scene, including i) detecting presence or absence of a product on the at least the portion of the conveyor depicted in the scene and ii) classifying the scene as having one or more characteristics among a predetermined set of characteristics. The processor is also configured to provide characteristics information indicating the one or more characteristics detected in the scene to a controller, wherein the characteristics information is to be used by the controller to control operation of one or both of a) the conveyor and b) the treatment area of the food processing system.

In yet another embodiment, a tangible, non-transitory computer readable medium storing machine readable instructions that, when executed by a processor associated with a sensor device, cause the processor to: receive a plurality of images capturing a scene that depicts at least a portion of a conveyer entering a treatment area of a food processing system, wherein respective ones of the images capture the scene at respective points in time; process one or more images, among the plurality of images, to detect one or more characteristics in the scene, including i) detecting presence or absence of a product on the at least the portion of the conveyor depicted in the scene and ii) classifying the scene as having one or more characteristics among a predetermined set of characteristics; and provide characteristics information indicating the one or more characteristics detected in the scene to a controller, wherein the characteristics information is to be used by the controller to control operation of one or both of a) the conveyor and b) the treatment area of the food processing system.

Further scope of applicability of the apparatuses and methods of the present disclosure will become apparent from the more detailed description given below. It should be understood that the following detailed description and specific examples, while indicating embodiments of the apparatus and methods, are given by way of illustration only, since various changes and modifications within the spirit and scope of the concepts disclosed herein will become apparent to those skilled in the art from the following detailed description.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

Figure 1:
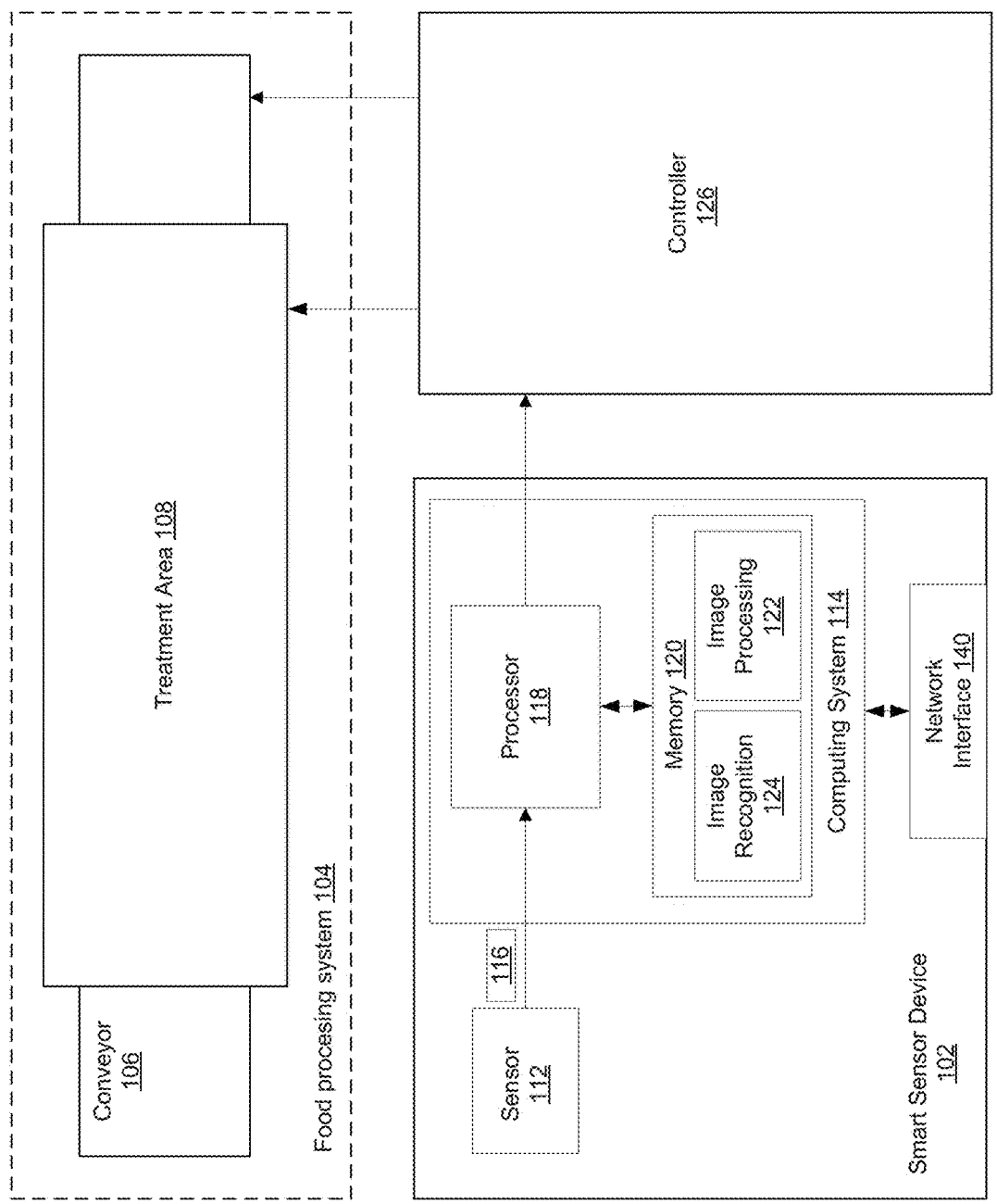
FIG. 1 is a block diagram of a system that includes a sensor device configured to provide control for a food processing system, according to an embodiment.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

In embodiments described below, a sensor device may be utilized to monitor operation of food processing equipment, such as an industrial chiller or freezer in a food processing plant, for example. The sensor device may obtain images of a scene capturing at least a portion of a conveyor at an entrance to a treatment area of the chiller or freezer, and may process the image to detect one or more characteristics in the scene, such as a presence or absence of a product on the conveyor depicted in the scene, a type of the product present on the conveyor depicted in the scene, a volume of a product present on the conveyor depicted in the scene, a mass of the product present on the conveyor depicted in the scene, a degree of coverage of the conveyor depicted in the scene, a location and/or distribution of a product on the conveyor depicted in the scene, etc., in various embodiments. The images may be obtained by an infrared (IR) camera that allows capture of the scene even in the presence of fog that may be created by use of certain coolant substances, such as, for example, liquid nitrogen (LIN) or carbon dioxide ($CO_2$), in the treatment area for chilling or freezing the product, in an embodiment. Additionally or alternatively, the images may be obtained by a visible light camera, for example in scenarios in which no fog, or a sufficiently low amount of fog, is present, in an embodiment.

The sensor device may include or be coupled to a controller that may be configured to control operation of the conveyor and/or the treatment area based on the characteristics detected by the sensor device in the scene captured in the images. For example, the controller may adjust a speed at which the conveyor moves through the treatment area and/or an amount of coolant substance dispensed in the treatment area based on the type, mass, volume, degree of coverage, etc. of product on the conveyor as identified by the sensor device based on the images. As just another example, the controller device may adjust amount and/or location of the coolant substance in the treatment based on a location and/or distribution of the product on the conveyor as identified by the sensor device based the images. Such automatic control of the conveyor belt and/or treatment area based on detected, real-time characteristics of the product results in more efficient use of the food processing system as compared to systems in which such automatic control based on detected real-time operating characteristics is not provided, in at least some embodiments.

FIG. 1 is a block diagram of a system 100 that includes a sensor device 102 (sometimes referred to herein as "smart sensor device") configured to provide control for a food processing system 104, according to an embodiment. The food processing system 104 includes a conveyor belt 106 that moves through a treatment area 108. The treatment area 108 may be an enclosed area, such as a tunnel, for example. As the conveyor belt moves through the treatment area 108, a suitable coolant substance, such as a cryogenic substance (e.g., LIN, $CO_2$, etc.) or another suitable coolant substance, may be dispensed from dispensers (not shown) that may be positioned along the conveyor belt 106 (e.g., above the conveyor belt) in the treatment area 108. The coolant substance may thereby be supplied to a product that may be placed on the conveyor belt 106 to bring down a temperature of the product to a desired chilling or freezing temperature as the product on the conveyor belt 106 is treated in the treatment area 108.

The sensor device 102 may include a sensor 112 coupled to a computing system 114. The sensor 112 (also sometimes referred to herein as camera 112) may comprise a camera that may be positioned at a suitable distance from the conveyor belt 106. The camera 112 may be configured to obtain images 116 of a scene capturing at least a portion of the conveyor belt 106 at or near an entrance to the treatment area 108. The computing system 114 may be implemented on one or more integrated circuit (IC) devices, for example. The computing system 114 may include a processor 118 and a computer readable memory 120 that stores computer readable instructions executable by processor 118. Computer readable memory 120 may store an image processing system 122 and an image recognition system 124. Computer readable memory 120 may include volatile memory to store computer instructions, such as Random Access Memory (RAM), and may also include persistent memory such as, for example, a hard disk, hard-drive or any other stable storage space, e.g. a secure digital ("SD") card, a flash drive, etc., in various embodiments. Although the computing system 114 is illustrated in FIG. 1 as including a single processor 118, the computing system 114 includes multiple processors 118 in other embodiments. In some embodiments, the image processing system 122 and/or the image recognition system 124 may be implemented on a processor that is remote from the sensor device 102. For example, the image processing system 122 and/or the image recognition system 124 may be stored in a computer readable memory of a server device (not shown), and may be implemented on one or more processors of the server device, that may be communicatively coupled to the sensor device 102 via a network (e.g., a wide area network (WAN) such as the Internet, a local area network (LAN), or any other suitable type of network) by a way of a network interface 140 that may be included in the sensor device 102. In this embodiment, the sensor device 102 may transmit the image 116, and/or additional information needed for processing of the images 116, to the server device via the network interface 140 to enable the server device to remotely process the images 116. Further, in some embodiments, the image processing system 122 and/or the image recognition system 124 may be implemented using hardware components, firmware components, software components, or any combination thereof.

In an embodiment, the sensor 112 may comprise an IR camera that may enable capture of images depicting the conveyor belt 106 even in presence of fog that may be created by use of certain coolant substances, such as, for example, LIN or $CO_2$ substances, in the treatment area 108. In another embodiment, however, the sensor 112 may additionally or alternatively comprise a visible light camera. In an embodiment in which the sensor 112 comprises both an IR camera and a visible light camera, the sensor device 102 may be configured to utilize one of the IR cameras and the visible light camera based on operating conditions of the food processing system 104 and/or ambient conditions. For example, the IR camera may be utilized when a sufficient amount of fog to obscure a view of a product on the conveyor belt 106 is present, and the visible camera may be utilized when no fog, or a sufficiently small amount of fog, is present. Using the visible light camera may be advantageous when a temperature of a product on the conveyor belt is sufficiently close to a temperature of the surface of the conveyor belt itself, which may make it difficult or impossible to capture the product on the conveyor belt 106 in an IR image, in an embodiment.

The images 116 captured by the camera 112 may be provided to the computing system 114. The computing system 114 may process the images 116 to detect one or more characteristics in the scene captured in the images 116. For example, the computing system 114 may process images 116 to detect presence or absence of a product on the at least the portion of the conveyor in the scene captured in the images 116.

In an embodiment in which the images 116 are IR images, the images may be processed with the image processing system 122 to detect presence or absence of a product on the at least the portion of the conveyor in the scene. In an embodiment, the image processing system 122 to detect presence or absence of a product on the at least the portion of the conveyor in the scene by processing values of pixels of the IR images to determine a number of pixels having values that exceeds a threshold temperature, indicating that the pixels correspond to a product placed on the conveyor belt 106 rather than an area not covered by a product on the conveyor 106. In an embodiment, the image processing system may additionally or alternatively detect presence or absence of a product on the at least the portion of the conveyor in the scene by determining a ratio of pixels of the IR image having values that exceed the threshold temperature (indicating that the pixels correspond to a product on the conveyor belt 106) to a total number of pixels in the IR image, or a ratio of pixels of the IR image having values that do not exceed a threshold temperature (indicating that the pixels correspond to an area of the conveyor belt 106 not covered by a product) to the total number of pixels in the IR image. Optionally, the image processing system 122 may track the ratio across multiple images 116, to detect an increase or a decrease in the ratio indicting that a product has been loaded onto the conveyor belt 106. The image processing system 122 may further detect one or more additional characteristics in the scene, such as a degree of coverage of the conveyor belt 106 by the product depicted in the scene, an operating temperature across the conveyor belt 106 depicted in the scene, etc.

The one or more images 116 may additionally or alternatively be provided to the image recognition system 124. In an embodiment in which the images 116 are IR images captured by the camera 112, the image recognition system 124 may render pixel data of the IR images 116 as visible images and may perform image recognition by processing the visible images. In an embodiment in which the images 116 are visible light images captured by the camera 112, the images 116 may be directly processed by the image recognition system 124 to detect presence or absence of a product on the at least the portion of the conveyor belt 106 depicted in the scene. Several examples of IR data rendered as visible images that may be processed by the image recognition system 124 are described in more detail below with reference to FIGS. 3A-3C. The image recognition system 124 may additionally or alternatively be configured to directly process visible light images that may be the same or similar to the IR image data rendered as visible images of FIGS. 3A-3C, in an embodiment.

The image recognition system 124 may be configured to detect one or more characteristics or conditions of the at least the portion of the conveyor belt 106 depicted in the scene. The image recognition system 124 may comprise a suitable neural network trained to identify, or recognize, one or more characteristics or conditions of the at least the portion of the conveyor belt 106 depicted in the images. For example, the neural network of the image recognition system 124 may be trained to classify a product depicted in the scene into one of a plurality of types of products, such as chicken or a specific part of a chicken (e.g., leg, breast, etc.), beef or a specific cut of beef (rib, brisket, etc.), fish or a specific type of fish (e.g., salmon, trout, etc.), meat patties, a type of fruit or vegetable, etc., in an embodiment. In some embodiments, the neural network of the image recognition system 124 may be trained to classify the scene as a scene depicting an empty conveyor belt, as a scene depicting a certain amounts of products loaded on the conveyor belt, a scene depicting a product positioned at certain location on the conveyor belt, a scene capturing a wear condition (e.g., a stutter) of the conveyor belt, etc., for example.

In an embodiment, the image recognition system 124 may detect presence or absence of a product on the at least the portion of the conveyor in the scene by using the neural network, such as the CNN, that may be trained to classify images 116 into no-load images or images depicting one or more products on the conveyor belt 106, for example. When image recognition system 124 determines that one or more products are present in an image 116, the image recognition system 124 may further process the image 116 to detect one or more additional characteristics in the scene, such as a degree of coverage of the conveyor belt 106 by the one or more products depicted in the scene. For example, the image recognition system 124 may implement a segmentation process to segment the image 116 by creating "boxes" around the one or more products detected in the scene. The image recognition system 124 may then determine a number of pixels inside the segmented one or more boxes in the image 116, and may calculate an area that is covered by the one or more products depicted in the scene based on a correspondence between each pixel of the image 116 and a physical area (e.g., 1 square inch, 2 square inches, etc.) of a surface of the conveyor belt 106 depicted in the image 116.

Training of the neural network of the image recognition system 124 may involve using the sensor 112, or another suitable sensor, to obtain a set of training images of the scene depicting the at least the portion of the conveyor belt 106 (or another similar scene) under various predetermined operating conditions, such as an empty conveyor belt, different types and/or amounts of products loaded on the conveyor belt, products positioned at different locations on the conveyor belt, different wear conditions of the conveyor belt, conveyor vibrations, etc., for example. The set of training images may be obtained during a training stage of operation of the food processing system 104. Respective images in the set of training images may be annotated with corresponding characteristics, and may be stored in a memory (e.g., the memory 120 or another suitable memory) internal to the sensor device 102, or a removable memory, such as an external memory that may be temporarily connected to the sensor device 102. Alternatively, the set of training images may be transmitted to a server that may be communicatively coupled to the sensor device 102 via a network (e.g., a wide area network (WAN) such as the Internet, a local area network (LAN), or any other suitable type of network) by a way of the network interface 140. The set of training images may then be used to train a neural network, such as a CNN, to determine network parameters (e.g., node coefficients) of the neural network to teach the neural network to recognize unique features of the scene under the various operating conditions.

In operation stage of the food processing system 104, the image recognition system 124 may use the neural network with network parameters (e.g., node coefficients) determined during the training stage of the food processing system 104 to classify new incoming images 116 of the scene as scenes capturing the predetermined operating conditions. Thus, for example, the image recognition system 124 may use the neural network to identify an empty conveyor belt depicted in the scene, a type and/or amount of product loaded on the conveyor belt depicted in the scene, a location of the product on the conveyor belt depicted in the scene, a wear condition of the conveyor belt depicted in the scene, conveyor vibrations, etc., in various embodiments.

With continued reference to FIG. 1, the sensor device 102 may be configured to provide characteristics information indicating the one or more characteristics detected in the scene by the image processing system 122 and/or image recognition system 124 to a controller 126. Although the controller 126 is illustrated in FIG. 1 as being external to the sensor device 102, the controller 126 may be included as a part of the sensor device 102 in other embodiments. The controller 126 may be coupled to the food processing system 104, and may be configured to use the characteristics information received from the sensor device 102 to control operation of one or both of the conveyor belt 106 and the treatment area 108 of the food processing system 104. As an example, the controller 126 may be configured to automatically, in real time, adjust the speed of the conveyor belt 106 based on the detected type, mass, volume, etc., of the product that is loaded onto the conveyor belt 106. As another example, the controller 126 may be configured to automatically, in real time, control an amount and/or location of the coolant substance dispensed in the treatment area 108 based on the detected location and/or distribution of the product that is loaded onto the conveyor belt 106 to efficiently supply the coolant substance directly to the product on the conveyor belt 106. As yet another example, the controller 126 may shut down operation the conveyor belt 106 and/or the treatment area 108 when no product is detected on the conveyor belt 106, and may automatically turn on operation of the conveyor belt 106 and/or the treatment area 108 when a product is detected on the conveyor belt 106. In other embodiments, the controller 106 may control operation of the conveyor belt 106 and/or the treatment area 108 of the food processing system 104, based on the characteristics information received from the sensor device 102, in other suitable manners.

Referring still to FIG. 1, in some embodiments, the sensor device 102 may transmit the images 116 and/or the characteristics information indicating the one or more characteristics detected by the image processing system 122 and/or image recognition system 124 in the scene depicted in the images 116 to a server and/or one or more user devices (e.g., personal computers, laptops, cellular phones, etc.) via a network (e.g., a wide area network (WAN) such as the Internet, a local area network (LAN), or any other suitable type of network) by way of the network interface 140. The server and/or the one or more user devices may store and/or further analyze the images 116 and/or the characteristics information indicating the one or more characteristics detected in the scene depicted in the images 116. In some embodiments, the server and/or the one or more user device may provide alert signals to users, for example to inform the users that the conveyor belt 106 may require maintenance.

Figure 2:
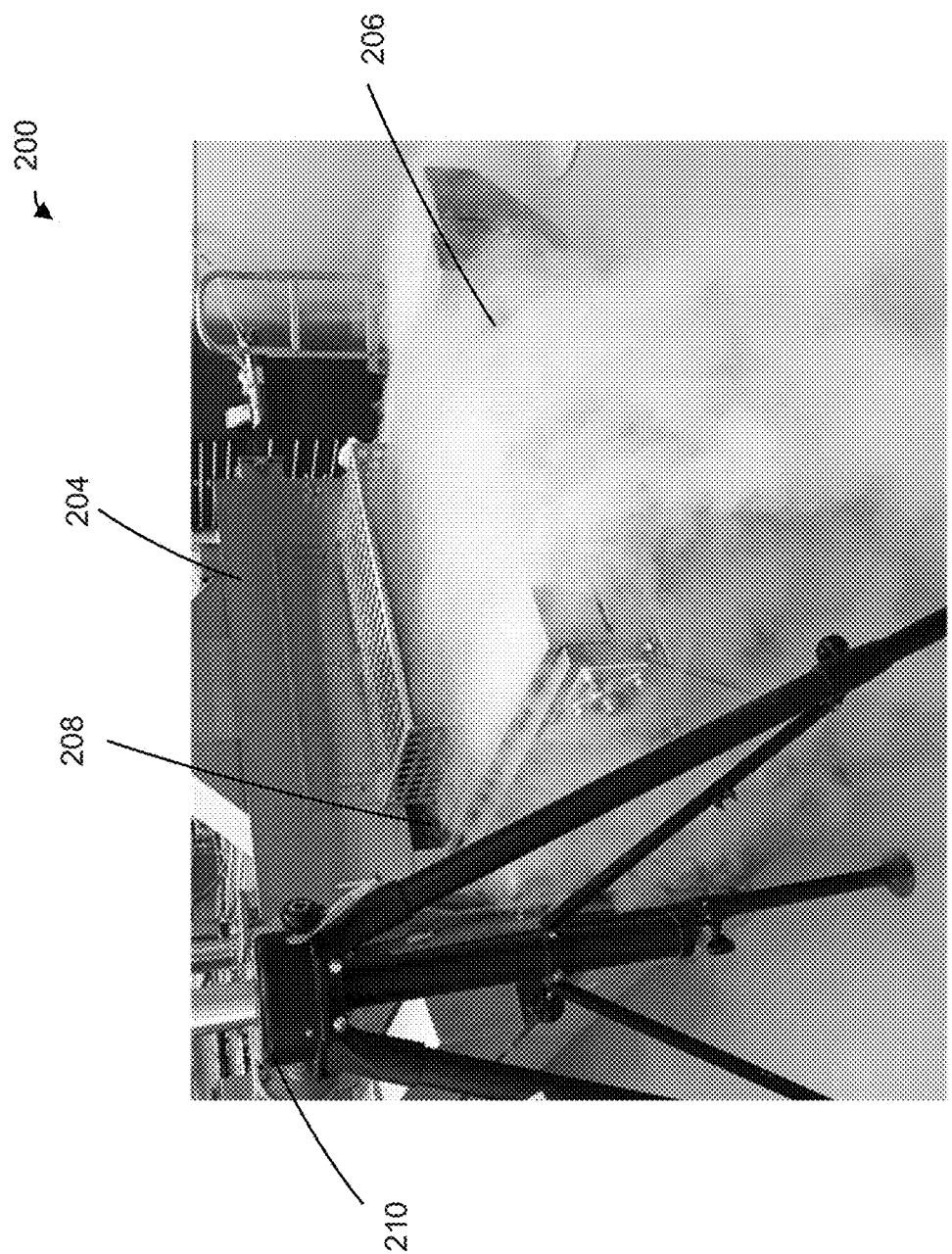
FIG. 2 is a diagram illustrating an example environment in which the sensor device of FIG. 1 may be utilized, according to an embodiment.

Referring now to FIG. 2, the sensor device 102 may be utilized in an environment 200 to provide real-time automatic control for a food processing system 204, according to an embodiment. The food processing system 204 corresponds to the food processing system 104 of FIG. 1, in an embodiment. The food processing system 204 may be equipped with a conveyor belt 206 corresponding to the conveyor belt 106 of FIG. 1 and a treatment area 208 corresponding to the treatment area 108 of FIG. 1. One or more dispensers may be positioned along (e.g., above) the conveyor belt 206 as the conveyor belt 206 moves through the treatment area 208. In operation, the one or more dispensers in the treatment area 208 may dispense a suitable coolant substance to supply the coolant substance to a product that may be placed on the conveyor belt 206 to bring a temperature of the product to a desired chilling or freezing temperature. The coolant substance may be a cryogenic substance (e.g., LIN, $CO_2$, etc.) or another suitable coolant substance. Dispensing of the coolant substance in the treatment area 208 may create visual obstruction of a surface of the conveyor belt 206, such as in the form of fog covering the surface of the conveyor belt 206.

The sensor device 102 (not shown in FIG. 2) may be positioned near the conveyor belt 206 at or near an entrance to the treatment area 208. For example, the sensor device 102 may be mounted on a stand 210 or may be mounted on another suitable bracket such that the camera 112 of the sensor device 102 is positioned at or near an entrance to the treatment area 208 and has a field of view that includes at least a portion of the conveyor belt 206 entering the treatment area 108. The camera 112 may comprise an IR camera that can "see" through the fog that covers the surface of the conveyor belt 206, and may allow capture of images 106 that depict a product that may be placed on the surface of the conveyor belt 206 even in the presence of fog at the entrance to treatment area 208.

The images 106 captured by the camera 112 may be provided to the computing system 114 of the sensor device 102, and the images 116 may be processed by the image processing system 122 and/or image recognition system 124 of the computing system 114 to detect one or more characteristics of the conveyor belt 208 depicted in the images 116. In an embodiment, processing the images 116 may include determining whether the conveyor belt 206 is currently empty or is currently loaded with a product placed on the conveyor belt 206. Additionally or alternatively, processing the images 116 may include classifying the scenes depicted in the images 116 as having one or more characteristics from a predetermined set of characteristics, for example to identify a type of a product on the conveyor belt 206, a volume of the product on the conveyor belt 206, a mass of the product on the conveyor belt 206, a location and/or distribution of the product on the conveyor belt 206, a speed of the conveyor belt 206, etc. Operation of the conveyor belt 206 and/or the treatment area 208 may then be controlled based on the characteristics detected in the scenes in the images 116. For example, speed of the conveyor belt 206 may be adjusted, amount and location concertation of coolant substance dispensed in the treatment area 208 may be adjusted based on detected type of product on the conveyor belt 206, volume of product on the conveyor belt 206, mass of product on the conveyor belt 206, distribution of product, current speed of the conveyor belt 206, etc. in various embodiments.

Figure 3A:
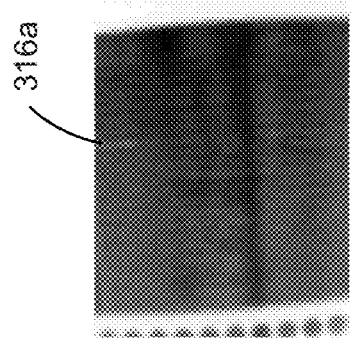
FIGS. 3A-3C illustrate example images that may be processed by the sensor device of FIG. 1, according to an embodiment.
Figure 3B:
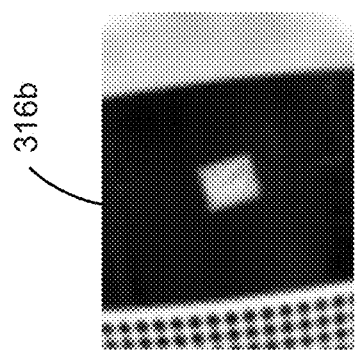
Figure 3C:
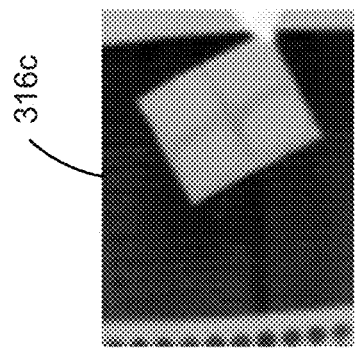

Referring briefly to FIGS. 3A-3C, example images 316 may correspond to the images 116 in FIG. 1, according to an embodiment. The images 316 may be IR images obtained by the camera 112 and rendered as visible images, for example. As another example, images the same as or similar to the images 316 may be visible light images obtained by the sensor 112. The images 316 may capture scenes that depict at least a portion of the conveyor belt 106 at different points in time, for example. The image 316*a* illustrated in FIG. 3A depicts an empty "no-load" condition of the conveyor belt 106. The image 316*b* of FIG. 3B depicts a single meat patty placed near the middle of the conveyor belt 106. The image 316*c* of FIG. 3C depicts four meat patties placed towards a center of the conveyor belt 106. The images 316 may be processed by the image processing system 122 and/or the image recognition system 124 to detect one or more characteristics in the scenes captured in the images 316. The one or more characteristics detected in the scenes captured in the images 316 may be provided to the controller 126 to enable the controller 106 to automatically control operation of the conveyor belt 106 and/or treatment area 108 of the food processing system 104 based on real-time characteristics detected in the scenes depicted in the images 316.

Referring now to FIG. 3A, the image processing system 122 and/or the image recognition system 124 may process the image 316*a* to detect that no product is currently present on the conveyor belt 106. In response to the determination that no product is currently present on the conveyor belt 106, the controller 126 may shut down the conveyor belt 126 and/or shut down coolant dispensers in the treatment area 108. With reference now to FIG. 3B, the image processing system 122 and/or the image recognition system 124 may process the image 316*b* to detect that a product has been loaded onto the conveyor belt 106, and to classify the product as a single meat patty placed in the middle of the conveyor belt 106. In response, the controller 126 may control the conveyor belt 106 to begin moving at a speed that is optimized for cooling of freezing a single meat patty and/or may control dispensers in the treatment area 108 to dispense an amount of coolant substance that may be optimized for cooling of freezing a single meat patty positioned in the middle of the conveyor belt 106 as the conveyor belt 106 moves through the treatment area 108. Referring now to FIG. 3C, the image processing system 122 and/or the image recognition system 124 may process the image 316*c* to detect that a new product has been loaded onto the conveyor belt 106, and to identify the new product as four meat patties placed at the center of the conveyor belt 106 and covering more space on the conveyor that a single patty. In response, the controller 126 may control the conveyor belt 106 to decrease the speed of the conveyor belt 106 because it may take longer to cool or freeze four meat patties as compared to the amount of time needed for cooling or freezing a single meat patty. Additionally or alternatively, the controller 126 may adjust the amount and location of coolant dispensed in the treatment area 108 so that an appropriate amount of coolant substance is supplied to a larger area of the conveyor belt 106.

Figure 4:
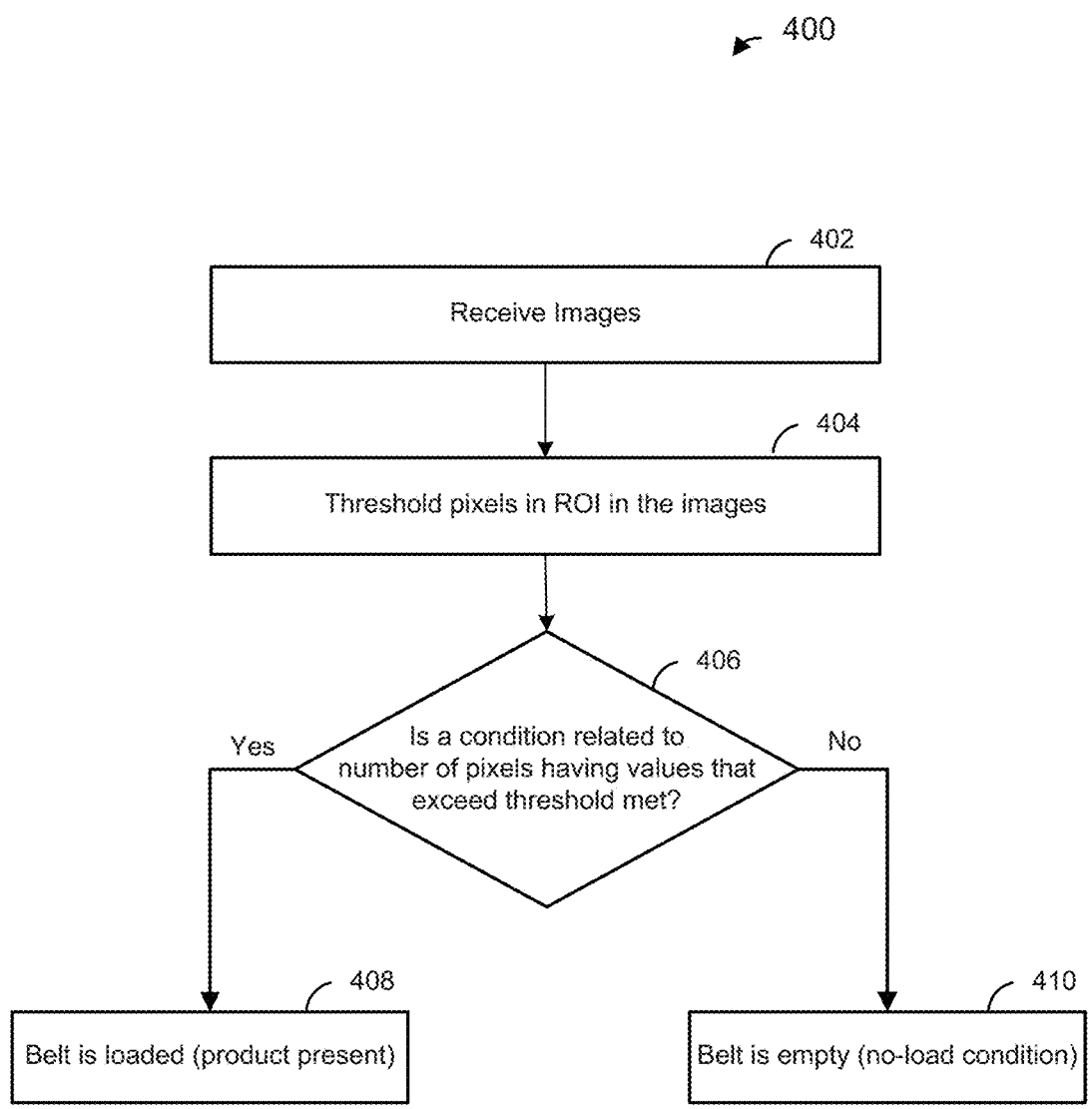
FIG. 4 is a flow diagram of a process that may be implemented by the sensor device of FIG. 1, according to an embodiment.

FIG. 4 is a flow diagram of a process 400 that may be implemented by the image processing system 122 of the sensor device 102 of FIG. 1, according to an embodiment. For ease of explanation, the process 400 is described below with reference to the sensor device 102 of FIG. 1. However, the process 400 may be implemented by a suitable sensor device different from the sensor device 102 of FIG. 1, in some embodiments.

At a block 402, one or more images of a scene are received by the image processing system 122. The one or more images may depict at least a portion of the conveyor belt 106 at different points in time, for example. In an embodiment, one or more IR images obtained by the sensor device 102 are received. In an embodiment, one or more images 116 of FIG. 1 are received. In an embodiment, one or more images 316 of FIGS. 3A-3C are received. In other embodiments, suitable images different from the images 116 and the images 316 are received.

At block 404, respective images, of the one or more images received at block 402, are thresholded by the image processing system 122. In an embodiment, thresholding an image comprises comparing values of pixels in a region of interest (ROI) in the image to a threshold temperature. The threshold temperature may be set to be above a temperature of the conveyor belt 106, which may be at or below room temperature, but below an expected temperature of products that may be loaded onto the conveyor belt 106. In an embodiment, a value of the threshold temperature is predetermined (e.g., pre-programmed in the image processing system 122). In another embodiment, the value of the threshold is determined dynamically, for example based on operating conditions of the food processing system 104 and/or based on processed images 116 captured by the camera 112. To threshold an image, the image processing system 122 may compare a value of each pixel in the region of interest in the image to determine, based on the comparison, whether or not the value of each pixel exceeds the temperature threshold. Pixels having values that exceed the threshold generally correspond to depiction of a product on the conveyor belt 106, while pixels having values that do not exceed the threshold generally correspond to depiction of an area of a surface of the conveyor belt 106 that is not covered by a product. The image processing system 122 may mark the pixels having values that exceed the threshold as "white" pixels and may mark the pixels that do not exceed the threshold as "black" pixels. In other embodiments, the image processing system 122 may use other suitable techniques for keeping track of pixels having values that exceed the threshold and pixels that do not exceed the threshold.

At block 406, it is determined whether a condition related to a number of pixels having values that exceed the threshold is met. For example, it is determined whether the number of "white" pixels is above a threshold. When the number of "white" pixels is above the threshold, this signifies that a product is present in the scene. Accordingly, in this case, the process 400 proceeds to block 408 at which it is determined that a product is present in the scene. On the other hand, when the number of "white" pixels is below the threshold, this signifies that no product is present in the scene. Accordingly, in this case, the process 400 proceeds to block 410 at which a no-load condition of the conveyor belt is determined.

In another embodiment, the image processing system 122 may track a ratio of pixels having values that do not exceed the threshold (e.g., pixels that correspond to a depiction of the conveyor belt 106 not covered by a product) to a total number of pixels in respective images 116 in a series of images and/or a ratio of pixels having values that exceed the threshold (e.g., pixels that correspond to a depiction of a product on the conveyor belt 106) to the total number of pixels in respective images 116 in the series of images. When the ratio of pixels having values that do not exceed the threshold to the total number of pixels in images of the series of images remains constant, this signifies that the conveyor belt 106 is currently empty. On the other hand, when the ratio of pixels having values that do not exceed the threshold to the total number of pixels in the series of images decreases, or, conversely, when the ratio of pixels having values that exceed the threshold to the total number of pixels in the series of images increases, this signifies that a product is now loaded on the conveyor belt 106. Thus, by tracking the ratio of pixels having values that do not exceed the threshold to the total number of pixels in respective images in the series of images and/or a ratio of pixels having values that exceed the threshold to the total number of pixels in respective images 116 in the series of images, the image processing system 122 may infer, in real time, absence or presence of a product on the conveyor belt 106. In an embodiment, based on a value of the ratio of pixels having values that exceed the threshold to the total number of pixels in respective images 116 in the series of images, the image processing system 122 may determine a degree of coverage of the conveyor belt 106 by the product.

Figure 5:
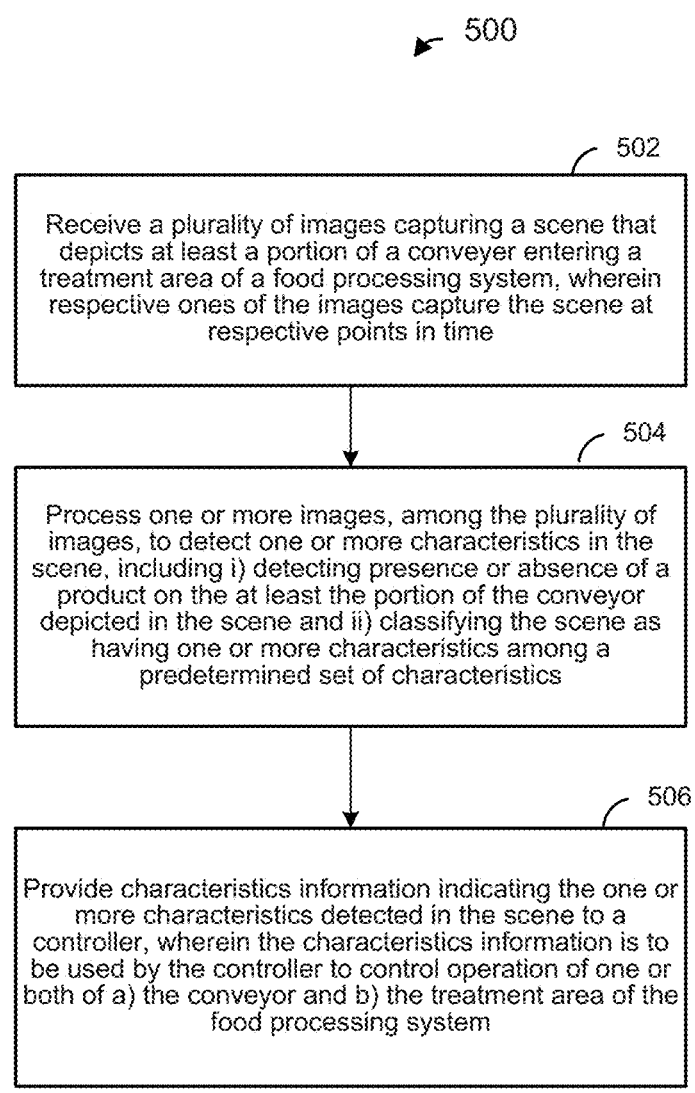
FIG. 5 is a flow diagram of a method for providing control for the food processing system FIG. 1, according to an embodiment.

FIG. 5 is a flow diagram of a method 500 for providing control for a food processing system, according to an embodiment. In an embodiment, the method 500 is implemented by the smart sensor device 102 of FIG. 1. For example, the method 500 is implemented by the computing system 116 of the smart sensor device 102 of FIG. 1, in an embodiment. In other embodiments, the method 500 is implemented by suitable components the smart sensor device 102 of FIG. 1 different from the computing system 116 or is implemented by a suitable sensor device different from the smart sensor device 102 of FIG. 1.

At block 502, a plurality of images capturing a scene are received. The scene may depict at least a portion of a conveyer entering a treatment area of the food processing system. In an embodiment, respective ones of the images capture the scene at respective points in time. In an embodiment, a plurality of IR images are received. In another embodiment, a plurality of visible light images are received. In an embodiment, images 116 are received by the computing system 114 of FIG. 1. As other example, in an embodiment, images 316 of FIGS. 3A-3C are received by the computing system 114 of FIG. 1. In other embodiments, other suitable images are received.

At block 504, one or more images, among the plurality of images received at block 502, are processed to detect one or more characteristics in the scene. In an embodiment, the one or more images are processed by the image processing system 122 and/or image recognition system 124 of FIG. 1. In an embodiment, processing the one or more images includes detecting presence or absence of a product on the at least the portion of the conveyor depicted in the scene. In an embodiment, the process 400 of FIG. 4 is used to detect presence or absence of a product on the at least the portion of the conveyor depicted in the scene. In another embodiment, a suitable process different from the process 400 of FIG. 4 is used to detect presence or absence of a product on the at least the portion of the conveyor depicted in the scene. For example, a neural network, such as a CNN, trained to classify images into empty-belt images or non-empty belt images is utilized to detect presence or absence of a product on the at least the portion of the conveyor depicted in the scene. Processing the one or more images may additionally include classifying the scene as having one or more characteristics among a predetermined set of characteristics. In an embodiment, a trained neural network, such as a CNN, is used to classify the product as having one or more characteristics among the predetermined set of characteristics. Classifying the product as having one or more characteristics may include one or more of i) a speed of the conveyor, ii) operating temperature across the conveyor, iii) a distribution of the product on the conveyor, iv) a degree of coverage of the conveyor by the product, and v) a maintenance condition of the conveyor, vi) a type of the product on the conveyor, vii) a volume and/or mass of the product on the conveyor, etc., in various embodiments.

At block 506, characteristics information indicating the one or more characteristics detected in the scene is provided to a controller. The characteristics information may then be used by the controller to control operation of one or both of a) the conveyor and b) the treatment area of the food processing system. For example, speed of the conveyor may be adjusted, amount and location concertation of coolant substance dispensed in the treatment area may be adjusted based on detected type of product on the conveyor, volume of product on the conveyor, mass of product on the conveyor, distribution of product, current speed of the conveyor, etc., in various embodiments. Automatic control of the conveyor and/or the treatment area based on the detected real-time operating characteristics results in more efficient use of the food processing system as compared to systems in which such automatic control based on detected real-time operating characteristics is not provided, in at least some embodiments.

Figure 6:
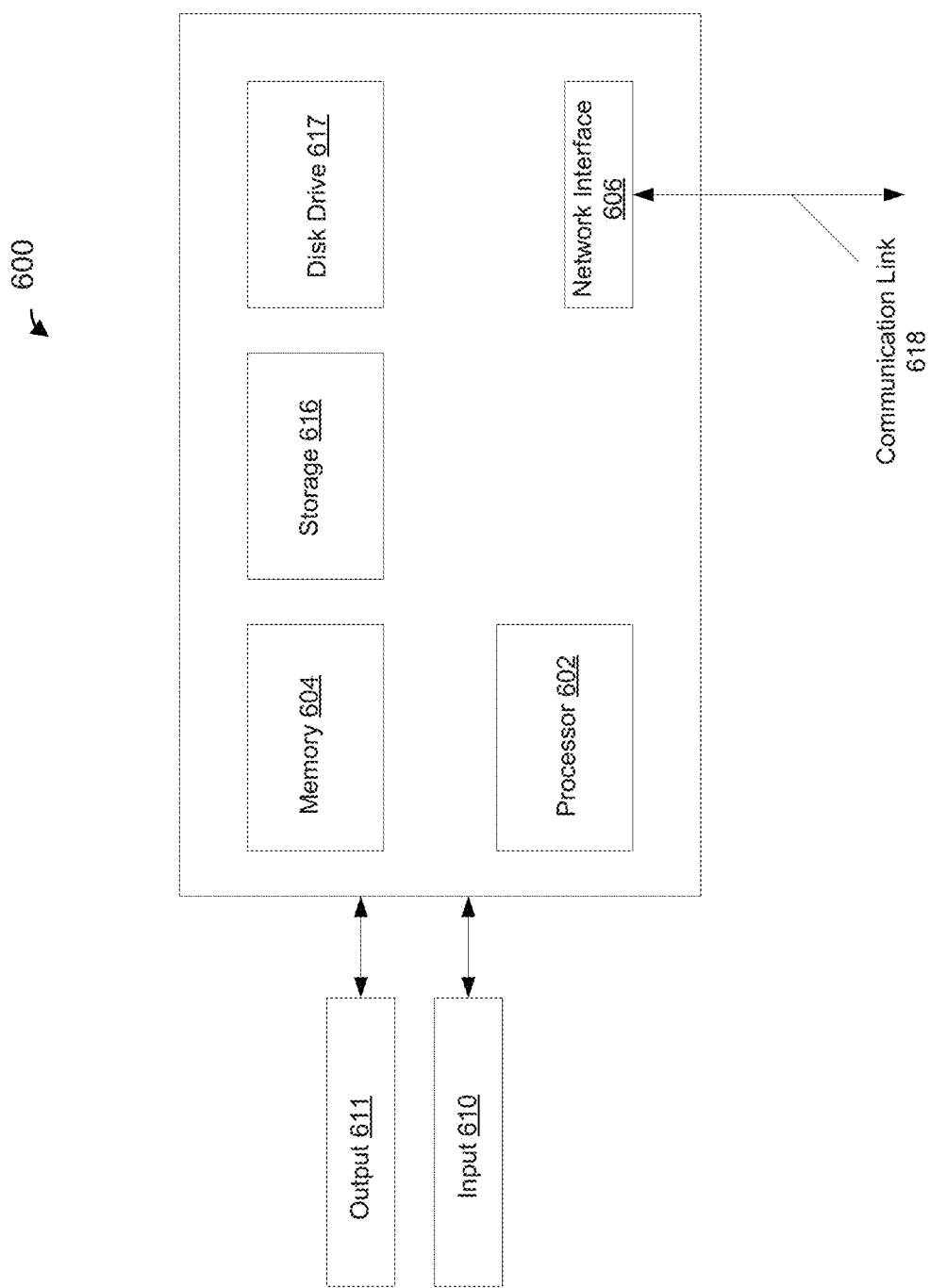
FIG. 6 is a block diagram of a computer system suitable for implementing one or more components of the system of FIG. 1, according to an embodiment.

FIG. 6 is a block diagram of a computing system 600 suitable for implementing one or more embodiments of the present disclosure. In its most basic configuration, the computing system 600 may include at least one processor 602 and at least one memory 604. The computing device 600 may also include a bus (not shown) or other communication mechanism for communicating information data, signals, and information between various components of computer system 600. Components may include an input component 610 that processes a user action, such as selecting keys from a keypad/keyboard, selecting one or more buttons or links, etc., and sends a corresponding signal to the at least one processor 602. Components may also include an output component, such as a display, 611 that may display, for example, results of operations performed by the at least one processor 602. A transceiver or network interface 606 may transmit and receive signals between computer system 600 and other devices, such as user devices that may utilize results of processes implemented by the computer system 600. In one embodiment, the transmission is wireless, although other transmission mediums and methods may also be suitable.

The at least one processor 602, which can be a microcontroller, digital signal processor (DSP), or other processing component, processes these various signals, such as for display on computer system 600 or transmission to other devices via a communication link 618. The at least one processor 602 may also control transmission of information, such as cookies or IP addresses, to other devices. The at least one processor 602 may execute computer readable instructions stored in the memory 604. The computer readable instructions, when executed by the at least one processor 602, may cause the at least one processor 602 to implement processes associated with processing images of a scene.

Components of computer system 600 may also include at least one static storage component 616 (e.g., ROM) and/or at least one disk drive 617. Computer system 600 may perform specific operations by processor 612 and other components by executing one or more sequences of instructions contained in system the memory 604. Logic may be encoded in a computer readable medium, which may refer to any medium that participates in providing instructions to the at least one processor 602 for execution. Such a medium may take many forms, including but not limited to, non-transitory media, non-volatile media, volatile media, and transmission media. In various implementations, non-volatile media includes optical or magnetic disks, volatile media includes dynamic memory, such as system memory component 614, and transmission media includes coaxial cables, copper wire, and fiber optics. In one embodiment, the logic is encoded in non-transitory computer readable medium. In one example, transmission media may take the form of acoustic or light waves, such as those generated during radio wave, optical, and infrared data communications.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations have been described herein in terms of "modules" or "components," it is noted that that terms are not limited to single units or functions. Moreover, functionality attributed to some of the modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A method of providing control for a food processing system, the method comprising:

receiving, at a processor of a sensor device, a plurality of images capturing a scene that depicts at least a portion of a conveyer entering a treatment area of the food processing system, wherein respective ones of the images capture the scene at respective points in time;

processing, with the processor of the sensor device, one or more images, among the plurality of images, to detect one or more characteristics in the scene, including i) detecting presence or absence of a product on the at least the portion of the conveyor depicted in the scene and ii) classifying the scene as having one or more characteristics among a predetermined set of characteristics; and providing, by the sensor device to a controller, characteristics information indicating the one or more characteristics detected in the scene, wherein the characteristics information is to be used by the controller to control operation of one or both of i) the conveyor and ii) ii) the treatment area of the food processing system;

wherein receiving the plurality of images comprises receiving a plurality of infrared (IR) images captured by an IR camera; and wherein processing the one or more images among the plurality of images includes i) rendering an IR image, among the plurality of IR images, as a visible image depicting the at least the portion of the conveyor in the scene, ii) processing the visible image to detect the one or more characteristics in the scene, iii) comparing values of respective pixels in an IR image, among the plurality of IR images, to a threshold temperature, the threshold temperature being between a temperature of a surface of the conveyor and a temperature of the product on the conveyor, iv) counting at least one of a) a first number of pixels having values that exceed the threshold temperature and b) a second number of pixels having values that do not exceed the threshold temperature, and v) determining at least one of the one or more characteristics of the scene based on a ratio of at least one of a) the first number of pixels having values that exceed the threshold temperature to a total number of the respective pixels in the IR image and b) the second number of pixels having values that do not exceed the threshold temperature to the total number of the respective pixels in the IR image.

2. The method of claim 1, wherein processing the one or more images among the plurality of images includes using a neural network to classify the product detected in an image, among the one or more images, into one of a plurality of predetermined types of products.

3. The method of claim 1, wherein determining the one or more characteristics of the scene includes determining whether the ratio of the first number of pixels having values that do not exceed the threshold temperature to the total number of the respective pixels in the IR image corresponds to i) a no-load constant or ii) is below the no-load constant, and in response to determining that the ratio of the first number of pixels having values that do not exceed the threshold temperature to the total number of the respective pixels in the IR image corresponds to the no-load constant, determining that the conveyor is currently empty, and in response to determining that the ratio of the first number of pixels having values that do not exceed the threshold temperature to the total number of the respective pixels in the IR image is below the no-load constant, determining that the product is currently present on the conveyor.

4. The method of claim 1, wherein determining the one or more characteristics of the scene includes determining, based on the ratio of the second number of pixels having values that do not exceed the threshold temperature to the total number of the respective pixels in the IR image, a degree of coverage of the at least the portion of the conveyor depicted in the scene by the product.

5. The method of claim 1, further comprising dynamically determining a value of the threshold temperature based on changing operating conditions of the conveyor.

6. The method of claim 1, wherein processing the one or more images among the plurality of images includes
   determining, based on at least one IR image among the plurality of IR images, distribution of the product on the conveyor, and
   determining, based on the distribution of the product on the conveyor, one or more control parameters for dispensing a cryogen substance in the treatment area of the food processing system such that the cryogen substance is dispensed in accordance with the distribution of the product on the conveyor.

7. The method of claim 1, wherein processing the one or more images among the plurality of images to detect the one or more characteristics of the scene includes determining, based on the one or more images among the plurality of images, one or more of i) a speed of the conveyor, ii) operating temperature across the conveyor, iii) a distribution of the product on the conveyor, iv) a degree of coverage of the conveyor by the product, and v) a maintenance condition of the conveyor.

8. A sensor device for providing control for a food processing system, the sensor device comprising
   at least one camera configured to capture a plurality of images capturing a scene that depicts at least a portion of a conveyor entering a treatment area of the food processing system, wherein respective ones of the images capture the scene at respective points in time, and wherein the at least one camera includes an IR camera configured to capture a plurality of IR images capturing the scene that depicts at least the portion of the conveyor entering the treatment area of the food processing system; and
   a processor implemented on one or more integrated circuit devices configured to
      i) process one or more images, among the plurality of images, to detect one or more characteristics in the scene, including a) detecting presence or absence of a product on the at least the portion of the conveyor depicted in the scene and b) classifying the scene as having one or more characteristics among a predetermined set of characteristics;
      ii) provide characteristics information indicating the one or more characteristics detected in the scene to a controller, wherein the characteristics information is to be used by the controller to control operation of one or both of a) the conveyor and b) the treatment area of the food processing system;
      (iii) render an IR image, among the plurality of IR images, as a visible image depicting the at least the portion of the conveyor in the scene,
      (iv) process the visible image to detect the one or more characteristics in the scene,
      (v) compare values of respective pixels in an IR image, among the one or more IR images, to a threshold temperature, the threshold temperature being between a temperature of a surface of the conveyor and a temperature of the product on the conveyor,
      (vi) count at least one of (a) a first number of pixels having values that exceed the threshold temperature and (b) a second number of pixels having values that do not exceed the threshold temperature, and
      (vii) determine at least one of the one or more characteristics based on a ratio of at least one of (a) the first number of pixels having values that exceed the threshold temperature to a total number of the respective pixels in the IR image and (b) the second number of pixels having values that do not exceed the threshold temperature to the total number of the respective pixels in the IR image.

9. The sensor device of claim 8, wherein the processor is configured to process the one or more images using a neural network to classify the product detected in the one or more images into one of a plurality of predetermined types of products.

10. The sensor device of claim 8, wherein the processor is configured to
    determine whether the ratio of the first number of pixels having values that do not exceed the threshold temperature to the total number of the respective pixels in the IR image corresponds to i) a no-load constant or ii) is below the no-load constant, and
    in response to determining that the ratio of the first number of pixels having values that do not exceed the threshold temperature to the total number of the respective pixels in the IR image corresponds to the no-load constant, determine that the conveyor is currently empty, and
    in response to determining that the ratio of the first number of pixels having values that do not exceed the threshold temperature to the total number of the respective pixels in the IR image is below the no-load constant, determine that the product is currently present on the conveyor.

11. The sensor device of claim 8, wherein the processor is configured to determine, based on the ratio of the second number of pixels having values that do not exceed the threshold temperature to the total number of the respective pixels in the IR image, a degree of coverage of the at least the portion of the conveyor depicted in the scene by the product.

12. The sensor device of claim 8, wherein
    the at least one camera includes an infrared IR camera and a visible light camera,
    the sensor device further comprises a sensor configured to determine whether or not fog is present at the conveyor, and
    the processor is further configured to select an image to be processed, the processor being configured to i) when it is determined that fog is present at the conveyor, select an IR image captured by the IR camera and ii) when it is determined that fog is not present at the conveyor, select a visible light image captured by the visible light camera.

13. A tangible, non-transitory computer readable medium storing machine readable instructions that, when executed by a processor associated with a sensor device, cause the processor to:
    receive a plurality of images capturing a scene that depicts at least a portion of a conveyer entering a treatment area of a food processing system, wherein respective ones of the images capture the scene at respective points in time;
    process one or more images, among the plurality of images, to detect one or more characteristics in the scene, including i) detecting presence or absence of a product on the at least the portion of the conveyor depicted in the scene and ii) classifying the scene as having one or more characteristics among a predetermined set of characteristics; and provide characteristics information indicating the one or more characteristics detected in the scene to a controller, wherein the characteristics information is to be used by the controller to control operation of one or both of a) the conveyor and b) the treatment area of the food processing system;

wherein the machine readable instructions, when executed by the processor associated with the sensor device, cause the processor to i) receive a plurality of infrared (IR) images captured by an IR camera capturing the scene that depicts at least the portion of the conveyor entering the treatment area of the food processing system, ii) render an IR image, among the plurality of IR images, as a visible image depicting the at least the portion of the conveyor in the scene, iii) process the visible image to detect the one or more characteristics in the scene.

iv) compare values of respective pixels in an IR image, among the one or more IR images, to a threshold temperature, the threshold temperature being between a temperature of a surface of the conveyor and a temperature of the product on the conveyor, v) count at least one of a) a first number of pixels having values that exceed the threshold temperature and b) a second number of pixels having values that do not exceed the threshold temperature, and vi) determine at least one of the one or more characteristics based on a ratio of at least one of a) the first number of pixels having values that exceed the threshold temperature to a total number of the respective pixels in the IR image and b) the second number of pixels having values that do not exceed the threshold temperature to the total number of the respective pixels in the IR image.

14. A method of providing control for a food processing system, the method comprising:

receiving, at a processor of a sensor device, a plurality of images capturing a scene that depicts at least a portion of a conveyer entering a treatment area of the food processing system, wherein respective ones of the images capture the scene at respective points in time;

processing, with the processor of the sensor device, one or more images, among the plurality of images, to detect one or more characteristics in the scene, including i) detecting presence or absence of a product on the at least the portion of the conveyor depicted in the scene and ii) classifying the scene as having one or more characteristics among a predetermined set of characteristics;

providing, by the sensor device to a controller, characteristics information indicating the one or more characteristics detected in the scene, wherein the characteristics information is to be used by the controller to control operation of one or both of i) the conveyor and ii) the treatment area of the food processing system;

detecting, with a sensor disposed in the sensor device, whether fog is present at the conveyor; and selecting an image to be processed by the processor, including i) when it is determined that fog is present in the scene, selecting an IR image captured by the IR camera and ii) when it is determined that fog is not present at the conveyor, selecting a visible light image captured by the visible light camera;

wherein obtaining the plurality of images comprises obtaining one or both of a) one or more infrared (IR) image captured by an IR camera and b) one or more visible light images captured by a visible light camera.

* * * * *